United States Patent
Pea

[11] Patent Number: 5,649,415
[45] Date of Patent: Jul. 22, 1997

[54] POWER SUPPLY CHAIN AND CHAIN CARRIAGE SYSTEM

[75] Inventor: Kevin I. Pea, Mayville, Wis.

[73] Assignee: Hubbell Incorporated, Orange, Conn.

[21] Appl. No.: 384,271

[22] Filed: Feb. 2, 1995

[51] Int. Cl.$^6$ .................................................. F16G 13/16
[52] U.S. Cl. ........................ 59/78.1; 191/12 C; 248/49; 248/51
[58] Field of Search ........................ 59/78.1; 248/49, 248/51; 191/12 C

[56] References Cited

U.S. PATENT DOCUMENTS

| | | |
|---|---|---|
| 2,864,907 | 12/1958 | Waninger et al. |
| 3,157,376 | 11/1964 | Merker et al. |
| 3,337,696 | 8/1967 | Waninger et al. ............ 191/12 C |
| 3,546,400 | 12/1970 | Dechantsreiter. |
| 3,779,003 | 12/1973 | Boissevain. |
| 3,994,373 | 11/1976 | Loos et al. ............ 191/12 C |
| 4,129,277 | 12/1978 | Tenniswood. |
| 4,462,565 | 7/1984 | Johnson. |
| 4,789,120 | 12/1988 | Spidel. |
| 5,108,350 | 4/1992 | Szpakowski. |
| 5,178,247 | 1/1993 | Vagaggini ............ 191/12 C |

FOREIGN PATENT DOCUMENTS

| | | |
|---|---|---|
| 672919 | 3/1966 | Belgium. |
| 0 299 187 | 1/1989 | European Pat. Off. |
| 1131964 | 10/1960 | Germany ............ 59/78.1 |
| 3644848 | 2/1988 | Germany ............ 59/78.1 |
| 3-190523 | 8/1991 | Japan. |
| 1 444 307 | 7/1976 | United Kingdom. |

OTHER PUBLICATIONS

Gleason PowerTrak, Cable/Hose Carrier Reference Guide, Cover page and pp. 42, 43, 44; dated 1994.
Gleason PowerTrak GRP, Non-Metallic Cable/Hose Carrier, Cover page and pp. 28, 29; dated 1994.
A and A Manufacturing Co. Inc., "GORTRAC Cable and Hose Carrier Systems", 6 pages 1985.
Belschleppketten fuer Energie-, Steuer- und Speiseleitungen zu beweglichen Verbrauchern, pp. 22–25.

*Primary Examiner*—David Jones
*Attorney, Agent, or Firm*—Edward J. Timmer

[57] ABSTRACT

Apparatus for carrying one or more power conduits to a movable power consumer includes one or more power supply chains, a carriage between static and dynamic portions of the chain and movable in response to movement of the power consumer via a sheave and cable carriage drive and having rollers positioned in response to movement of the power consumer to support a dynamic portion of a power supply chain when it sags in a chain guide tray as a result of the chain travelling beyond its self-supporting travel distance. The carriage rollers have a radius substantially less that the predetermined bend radius of the chain so that a compact, light-weight, low center-of-gravity carriage is provided for movement in a chain guide tray.

29 Claims, 5 Drawing Sheets

POWER SUPPLY CHAIN AND CHAIN CARRIAGE SYSTEM

FIELD OF THE INVENTION

The present invention relates to apparatus including a power supply chain for carrying one or more flexible power conduits to supply power to a relatively movable power consumer.

BACKGROUND OF THE INVENTION

Metal and plastic power supply chains are well known for supporting one or more power supply conduits or lines, such as electrical cables, fluid power hoses and the like, between a fixed position and a relatively movable position where the power supply chain is connected to a power consumer, such as movable machinery which can comprise, for example, a gantry or other crane, elevator, machine tool slide, robot, etc. The power supply chain typically is connected by brackets to a tow arm of the movable power consumer such that the chain is pulled or pushed at the bracket connection in order to effect chain travel with the power consumer.

In some service applications involving light-weight, plastic power supply chains where the chain is required to travel through an extended travel stroke to provide power to the relatively movable consumer, the dynamic portion of the power supply chain is designed to sag downwardly when the self-supporting travel distance of the chain is exceeded. The sagging portion of the power supply chain is supported atop the static portion of the chain residing on a support, such as on the bottom of a guide tray, and frictionally slides over the static portion of the chain during the travel stroke of the power consumer. The dynamic portion of the power supply chain typically is supported on the static portion of the chain in the guide tray in frictional contact therewith during a substantial portion of the total travel stroke of the movable power consumer. For illustration purposes, for a total travel stroke of the power consumer of 50 feet, frictional engagement between the dynamic and static chain portions can occur over 35 feet of travel, while for a total travel stroke of the power consumer of 300 feet, frictional engagement between the dynamic and static chain portions can occur over 285 feet of travel. In such power supply cable systems, the frictional sliding contact between the dynamic and static portions of the power supply chain during the stroke of the power consumer causes accelerated wear of the plastic chain components, requiring eventual replacement of worn chain components. Moreover, since the power supply chain is pulled or pushed at the bracket connection to the tow arm of the movable power consumer, the frictional sliding forces between the dynamic and static chains portions substantially increase towing forces on the power supply chain at the bracket connection to the power consumer, adversely affecting movement of the chain and also limiting the travel stroke of the chain.

Still further, in service applications where the power supply chain is received in a guide tray, the frictional resistance between the sagging portion and static portion of the chain when the chain is being returned to a less extended position by power consumer movement can cause upward buckling or upheaval of the dynamic portion of the chain out of the guide tray and possible loss of lateral chain stability wherein the chain buckles upwardly enough to fall to the side out of the guide tray in extreme situations. In the event the power supply chain falls out of the guide tray, the operation of the power consumer must be stopped until the power supply chain is positioned back in the guide tray.

An object of the present invention is to provide apparatus including a power supply chain, power supply chain carriage, and optional guide tray that overcomes the aforementioned disadvantages of previous flexible power supply systems in a manner to reduce wear of the power supply chain components, reduce towing forces at the movable power consumer connected to the power supply chain, and permit an increase of the travel stroke of the power supply chain.

SUMMARY OF THE INVENTION

The present invention provides in one embodiment apparatus for carrying at least one flexible power conduit to supply power to a relatively movable power consumer. The apparatus comprises a power supply chain having a fixed end and a movable end where the chain is connected to the power consumer, such as a crane, machine tool, robot and the like. The power supply chain typically includes a plurality of plastic or metal chain links arranged end-to-end with transverse carrier members for supporting the flexible power conduit between the fixed and movable ends for supplying power to the movable power consumer.

A roller carriage is disposed between static and dynamic portions of the chain which are interconnected by a chain bend of predetermined radius. The carriage includes wheels or rollers disposed on opposite sides and having a roller radius that is substantially less than the predetermined chain bend radius. As a result, the chain is spaced from and unsupported by the carriage rollers at the bend during chain travel.

The carriage wheels or rollers are positioned by carriage movement in response to movement of the power consumer to support the dynamic portion of the chain when it sags downwardly as a result of the chain travelling beyond its self-supporting travel distance. The carriage rollers are positioned to ride on a static portion of the chain when the chain is not extended beyond its self-supporting travel distance.

The carriage and the power consumer are drivingly connected by carriage drive means such that the carriage is moved in response to movement of the power consumer and such that the carriage drives the chain by virtue of frictional engagement between the carriage wheels or rollers and the chain. An exemplary means for drivingly connecting the carriage and power consumer includes a rotatable sheave or pulley proximate each end of the carriage and a pair of cables, one cable having an end connected to the power consumer and an opposite fixed end with an intermediate cable section reeved around one of the sheaves or pulleys and the other cable having an end connected to the power consumer and an opposite fixed end with an intermediate cable section reeved around the other of the sheaves or pulleys. One of the cables extends below a central region of the carriage, and the other cable extends above the central region of the carriage. In this way, towing force of the power consumer is applied to the cables to move the carriage which, in turn, drives the chain via frictional engagement between the carriage rollers and chain.

The apparatus optionally can include an elongated guide tray for receiving and guiding travel of the power supply chain. The guide tray includes a bottom wall and spaced apart upstanding side walls that define a channel for receiving the static portion of the chain while the dynamic portion of the chain extends out of the guide tray at a predetermined chain bend radius to the power consumer. Each guide tray sidewall includes a roller support surface that is generally coplanar with a top surface of the static portion of the chain and that is disposed longitudinally between the fixed end and a maximum position of travel of the movable end of the chain. The carriage is disposed in the guide tray channel for movement in response to movement of the power consumer to position the carriage rollers on the guide tray roller support surfaces to support the dynamic portion of the chain when it sags into the guide tray as a result of the chain travelling beyond its self-supporting travel distance, while the sidewalls confine lateral movement of the sagging portion of the chain.

The carriage wheels are sized such that upon travel of the chain beyond its self-supporting travel distance, the carriage and a majority of the sagging portion of the chain are confined in the guide tray. In particular, the sagging portion of the chain is confined and supported by engagement with the carriage rollers and laterally by the guide tray sidewalls.

The present invention provides in another embodiment apparatus including dual, opposed power supply chains for carrying at least two flexible power conduits to supply power to a relatively movable power consumer. The apparatus comprises first and second opposing power supply chains of the type described hereabove each having a fixed end and a movable end where each said chain is connected to the power consumer. A chain carriage of the type described hereabove is disposed between the first and second chains for movement in response to movement of the power consumer by driving connection therewith. The carriage is movable to position the carriage rollers to support a dynamic portion of one of the first and second chains when it sags into an optional elongated guide tray when the one chain travels beyond its self-supporting travel distance and to ride on a static portion of the other chain, and vice versa for movement of the power consumer in the other direction.

The present invention will be better understood by reference to the following detailed description taken with following drawings.

DESCRIPTION OF THE INVENTION

The present invention provides apparatus for carrying one or more flexible power conduits, such as one or more flexible electrical cables, fluid hoses, and other power conductors, to supply power to a relatively movable power consumer that may include, but is not limited to, a crane, machine tool slide, elevator, robot, positioner, manipulator, as well as any machine or device requiring electrical power and/or fluid power, such as hydraulic and pneumatic power.

FIGS. 1–4 illustrate apparatus pursuant to one embodiment of the invention including a single power supply chain to provide power to a power consumer, whereas FIGS. 5–8 illustrate apparatus pursuant to another embodiment of the invention including dual, opposing power supply chains to supply power to the power consumer. The embodiment of the invention of FIGS. 5–8 including opposing power supply chains is useful for supplying electrical power via one power supply chain and fluid power, such as hydraulic and/or pneumatic power, via the other power supply chain. Alternately, the embodiment of FIGS. 5–8 can be used when available space for power supply chains is limited and a more compact power supply apparatus is needed, regardless of the type of power conduits to be carried. In FIGS. 5–8, like features of FIGS. 1–4 are designated with like reference numerals primed.

Figure 1:
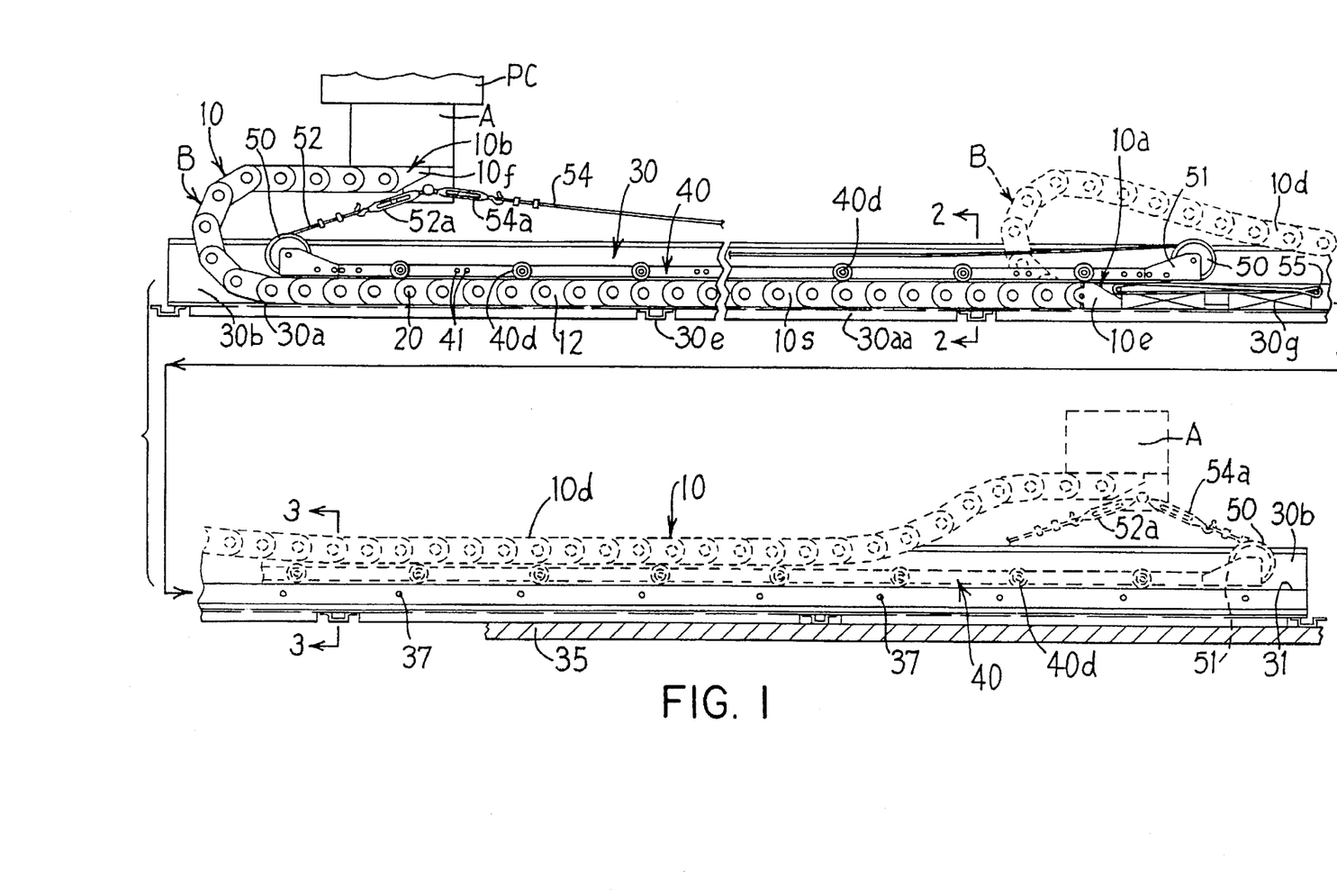
FIG. 1 is a longitudinal section view along a guide tray of an embodiment of the invention including a single power supply chain and carriage therein shown in elevation.
Figure 2:
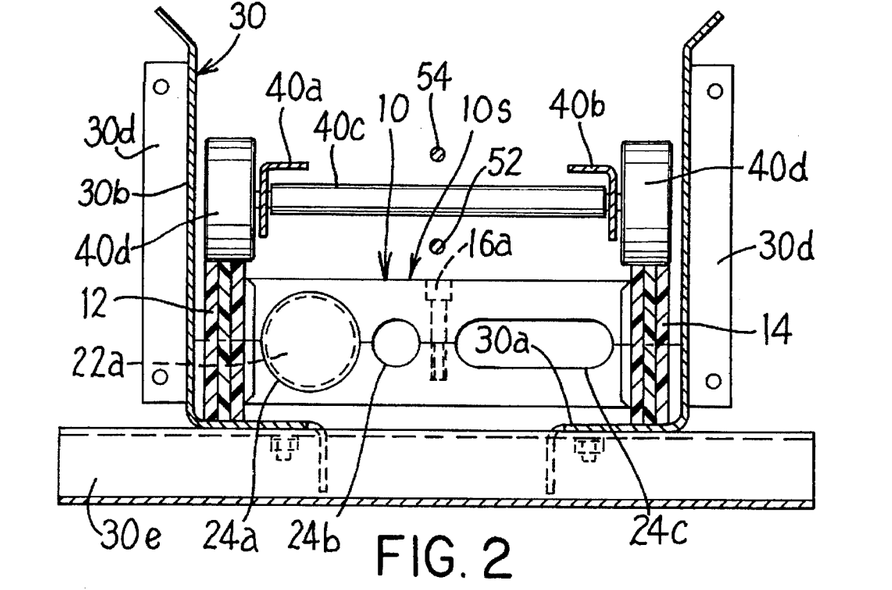
FIG. 2 is a transverse cross sectional view taken along lines 2—2 of FIG. 1.
Figure 3:
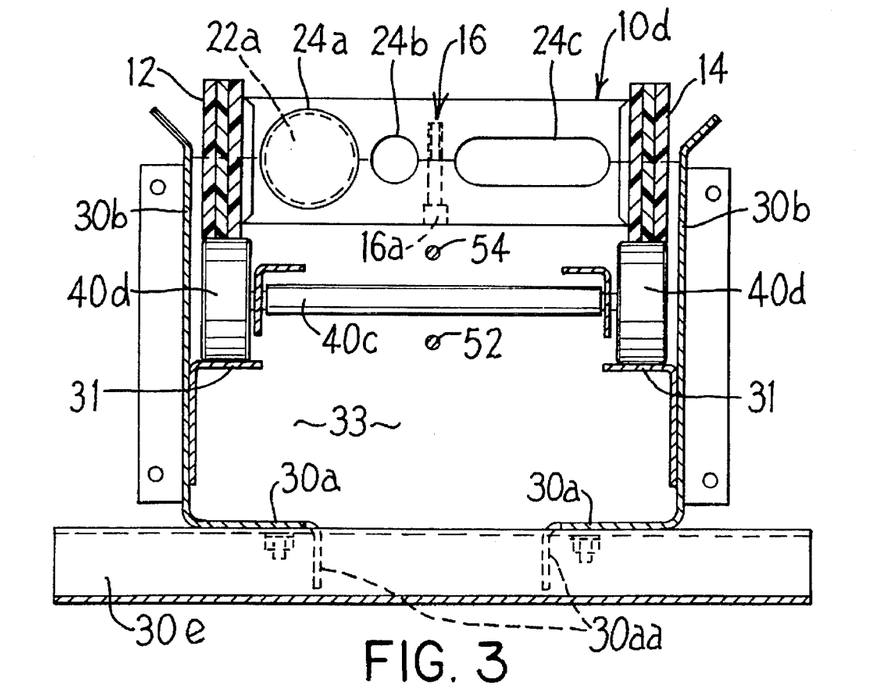
FIG. 3 is a transverse cross sectional view taken along lines 3—3 of FIG. 1.

Referring to FIGS. 1–4, a power supply chain 10 is shown having a fixed end 10a and a movable end 10b where the chain is connected to the tow arm A of the power consumer PC (shown schematically). The power supply chain 10 is of conventional construction and includes a pair of side chains 12, 14 interconnected by a plurality of transverse carrier members 16 to form chain links arranged end-to-end and pivotally connected at the ends by pivot pins 20 which can be molded integrally with the side chains. The transverse carrier members 16 include upper and lower carrier sections fastened together by fastener 16a. The carrier members 16 each are fastened between the side chains 12, 14 by suitable fasteners (not shown) and are configured as shown in FIGS. 2 and 3 to support in laterally spaced openings 24 one or more flexible power conduits (only power conduit 22a shown schematically in dashed lines in opening 24a). As mentioned, the power conduits can comprise flexible electrical cables and/or fluid hoses for hydraulic or pneumatic fluid. The power conduits extend from the fixed end 10a of the power supply chain 10 to the movable end 10b where the conduits supply power to the power consumer PC which is movable relative to the fixed end 10a.

The side chains 12, 14 typically comprise light-weight plastic side chains, although the invention can be practiced using metal side chains as well. The transverse carriers 16 typically also are made of plastic in the event that plastic side chains are used. Since plastic side chains are designed to intentionally sag in service when the chain travels beyond its self-supporting travel distance, the invention is particularly especially useful therewith to overcome the disadvantages mentioned hereabove encountered with previous power supply apparatus or systems using plastic power supply chains.

In FIGS. 1–4, the power supply chain 10 is shown received and guided in a stationary, elongated guide tray 30 including a bottom wall 30a and spaced apart upstanding side walls 30b that define a channel 33 for receiving a static portion 10s of the chain 10, while a dynamic portion 10d of the chain 10 extends out of the guide tray 30 to the power consumer PC. A bend B of predetermined radius is provided between the static portion 10s and the dynamic portion 10d of the power supply chain and remains generally constant during movement of the power supply chain as is well known. The chain bend radius constitutes a chain parameter that is predetermined by the system designer for a given power supply application as is well known in dependence on the dynamic bending characteristic of the flexible power conduits supported within the power supply chain, and such chain characteristics such as chain strength and pivot range of the chain links, and other factors.

In FIG. 1, the power supply chain 10 is shown in solid lines at its unextended position relative to its fixed end 10a and in dashed lines at its maximum travel position where the chain 10 includes a dynamic portion 10d that sags by design downwardly into the guide tray 30 as a result of the chain travelling beyond its self-supporting travel distance.

Each guide tray sidewall 30b includes a flange 31 extending inwardly into the channel. Each flange 31 includes an upwardly facing roller support surface that is generally coplanar with a top surface of the static portion 10s of the chain 10 as shown in FIG. 3. Each flange 31 is disposed longitudinally between the fixed end 10a and a maximum position of travel of the movable end 10b of the power supply chain 10. The guide tray 30 does not include the flanges 31 in the channel 33 at regions to the left of the fixed chain end 10a in FIG. 1. Threaded fasteners 37 join the flanges 31 to the guide tray 30.

The guide tray 30 can comprise a plurality of sections joined end-to-end at flanges 30d by suitable fasteners and is mounted on tray support brackets 30e by suitable fasteners for support on a stationary floor or other underlying support structure as is well known. The fixed end 10a of the power supply chain 10 includes a bracket 10e that is fixed by fasteners to the bottom wall 30a of the guide tray 30, or an underlying guide tray support 35 shown partially in FIG. 1. Bottom wall 30a terminates in a pair of spaced flanges 30aa. The movable end 10b of the chain 10 typically includes a bracket 10f fastened by fasteners to the tow arm A of the power consumer PC. At the fixed chain end 10a, the power conduits 22a, etc., are connected to corresponding fixed power sources (not shown) via suitable slots or cut-outs 30g in the guide tray sidewall.

Figure 4:
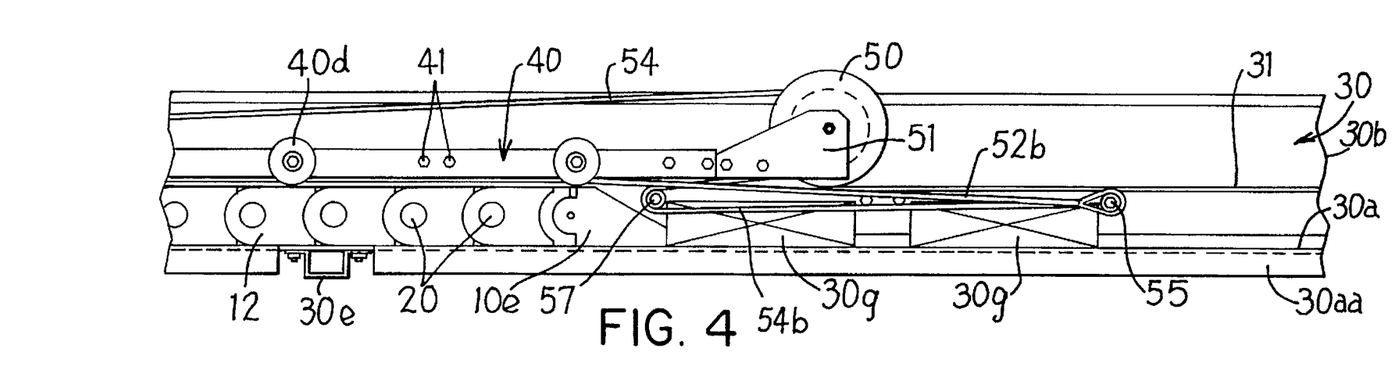
FIG. 4 is an enlarged partial longitudinal cross sectional view of the fixed end of the power supply chain of FIG. 1.
Figure 5:
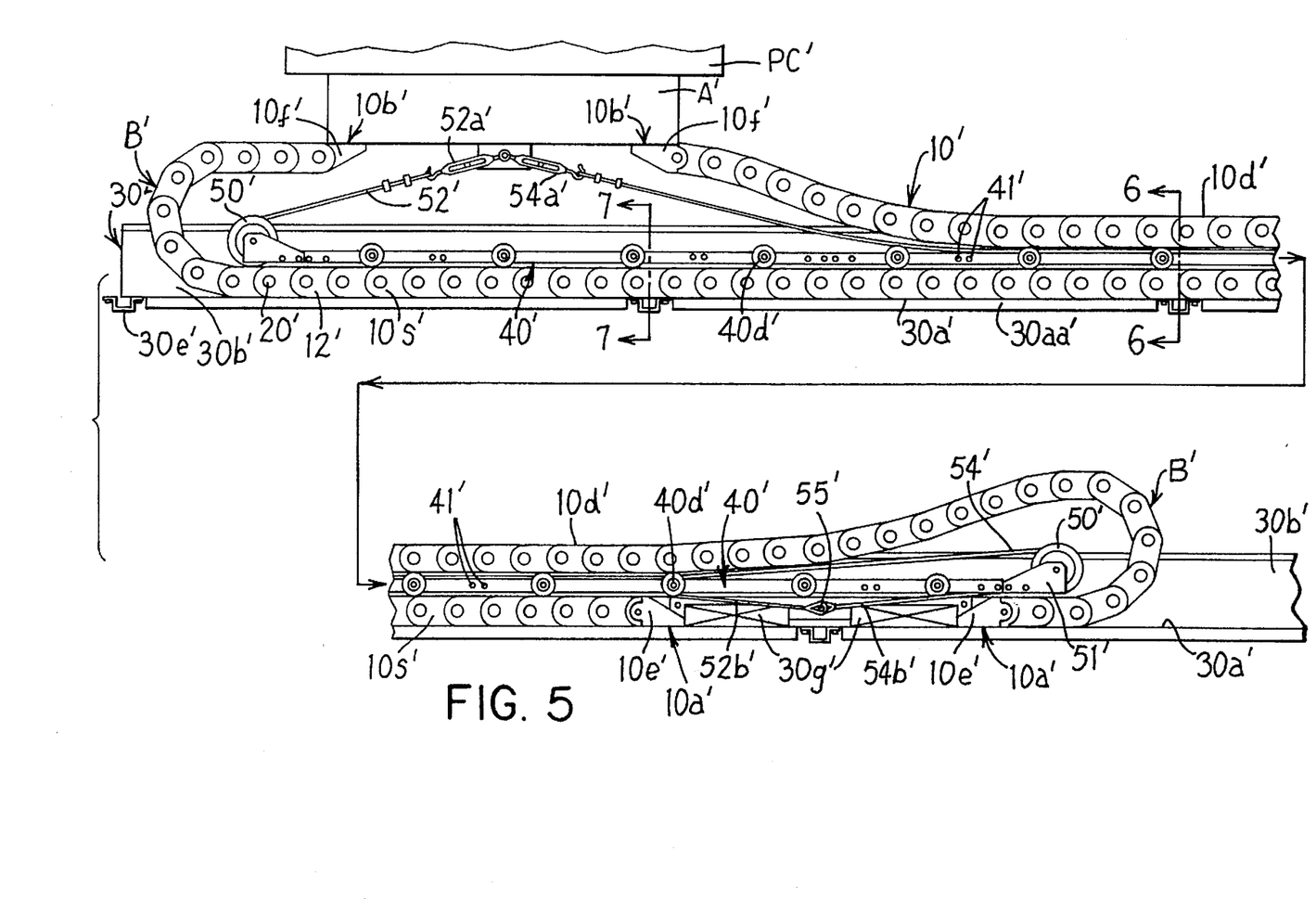
FIG. 5 is a longitudinal cross sectional view of another embodiment of a power supply chain/carriage/guide tray system including opposing power supply chains.

A chain carriage 40 is disposed in the channel 33 of the guide tray 30 for movement in response to movement of the power consumer PC in a manner to be explained. The carriage 40 includes first and second side frames 40a, 40b shown best in FIGS. 2 and 3 and a plurality of non-rotating axles 40c disposed transversely between the side frames and on which plastic or metal carriage wheels or rollers 40d are rotatably mounted by threaded fasteners so as to be disposed on opposite sides of the carriage 40 as shown in FIGS. 3–4. Each side frame 40a, 40b may comprise multiple frame sections fastened end-to-end together or a single frame member. The opposite side frames 40a, 40b are joined together by suitable transverse tie rod fasteners 41 and the axles 40c.

The carriage rollers 40d have a radius dimension that is independent of the predetermined radius of the chain bend B since the carriage wheels 40d do not support the power supply chain 10 at the bend B. Instead, the carriage rollers are spaced from the power supply chain 10 at the bend B. As is apparent, the radius dimension of the carriage wheels or rollers 40d is substantially less than that of the bend radius and the height dimension of the carriage side frames 40a, 40b is minimized as shown to provide a compact, lightweight, low center-of-gravity carriage that nests or resides within the dimensions of the guide tray 30 as shown so that the static portion 10s of the power supply chain 10 and the power conduits carried thereon are guided, confined laterally, and protected in the guide tray 30. In particular, the carriage rollers 40d are sized such that the carriage 30 and a majority of the height of sagging portion 10d of the chain 10 reside in the guide tray 30 as illustrated in FIG. 3 when the chain travels beyond its self-supporting travel distance. In this way, the sagging portion 10d of the power supply chain 10 is confined and supported from beneath by engagement with the carriage rollers 40d and laterally by the guide tray sidewalls 30b to prevent unwanted lateral chain movement.

For purposes of illustration and not limitation, a carriage roller radius of 1.25 inches can be used in conjunction with a chain bend radius of 11.0 inches in practicing the invention. The height of carriage side frames can be 1.5 inches.

As is apparent, the sagging portion 10d of the power supply chain 10 is supported by engagement with the carriage rollers 40d in a manner that reduces frictional resistance relative to the power supply chain and thus reduces wear of the chain components. Moreover, reduced frictional resistance provided by support of the sagging chain portion 10d on the carriage rollers 40d reduces tow forces exerted on the tow arm A of the power consumer PC and the tendency of the chain 10 to buckle or heave upwardly out of the guide tray 30 when the power consumer PC is moved from the dashed line position in FIG. 1 to the left to return the chain toward the unextended position illustrated in solid lines.

The carriage 40 is movable in the guide tray 30 in response to movement of the power consumer PC by virtue of a driving connection therewith that includes a rotatable sheave or pulley 50 proximate each end of the carriage 40 and first and second cables or ropes 52, 54 having turnbuckle ends 52a, 54a connected to the tow arm A of the power consumer PC and opposite ends 52b, 54b fixed to an anchor 55. Cable 54b is connected to the common anchor 55 after reeving around an idler pulley 57. The cable 52 extends beneath a central region of the carriage 40, while the cable 54 extends above the central region of the carriage as shown best in FIGS. 2 and 3. The sheaves 50 are mounted on sheave supports 51 that, in turn, are joined by suitable threaded fasteners to the frames 40a, 40b.

The sheave/cable means for drivingly connecting the carriage 40 and the power consumer PC provides carriage movement in the guide tray channel 33 in response to movement of the power consumer. In effect, this driving connection subjects the cables 52, 54 to forces for moving the carriage 40 and the power supply chain 10. Moreover, the carriage 40 assists or drives movement of the power supply chain 10 by virtue of frictional engagement between the carriage rollers 40d and the chain 10. That is, the towing force of the power consumer is transmitted to the carriage 40 via the sheave and cable arrangement, and the carriage 40 drives the power supply chain 10 via frictional contact between the rollers 40d and the side chains 12, 14.

The cable/sheave driving connection between the carriage 40 and the power consumer PC is effective to move the carriage 40 in a manner to position the carriage wheels 40d on the sidewall flanges 31 in channel 33 so as to supportingly engage the dynamic portion of the power supply chain 10 when it sags into the guide tray 30 as a result of the chain travelling beyond its self-supporting travel distance, while the guide tray sidewalls 30b confine lateral movement of the sagging portion 10d as is apparent in FIGS. 1 and 3. On other hand, the carriage 40 is moved by sheave/cable driving arrangement to position the carriage wheels 40d to ride on the static portion 10s of the power supply chain 10 when the chain is not extended beyond the self-supporting travel distance as is apparent in FIGS. 1 and 2.

The length of the carriage 40 typically is selected to be equal to approximately ½ of the total travel stroke of the power consumer PC to locate the sheave 50 proximate the bend radius B of the power supply chain 10. The location and the diameter of the sheaves 50 are selected, however, so as to avoid contact of the sheave with the power supply chain at the chain bend. The size (e.g. diameter) of the sheaves as well as the size (diameter) of the carriage rollers 40d can be selected to enhance the service lives thereof when extended travel of the power supply chain is required. For example, the diameters of the sheaves and carriage rollers may be increased to reduce the number of sheave or roller revolutions during chain travel within the context of the invention as described hereabove to increase the service lives thereof.

Referring to FIGS. 5–8, another embodiment of the invention is illustrated including a pair of opposing power supply chains 10' providing power to a common power consumer PC' centrally located therebetween such that each power supply chain 10' can accommodate the entire movement of the power consumer.

The apparatus of FIGS. 5–8 includes first and second opposing power supply chains 10' of the type described hereabove with respect to FIGS. 1–4. Thus, each power supply chain has a fixed end 10a' and a movable end 10b' where each chain is connected to the tow arm A' of the power consumer PC'. Each power supply chain includes a pair of side chains 12', 14' interconnected by a plurality of transverse carrier members 16' for supporting respective flexible power conduits 22a', etc., between the fixed and movable chain ends 10a', 10b' for supplying power to the movable power consumer.

Figure 6:
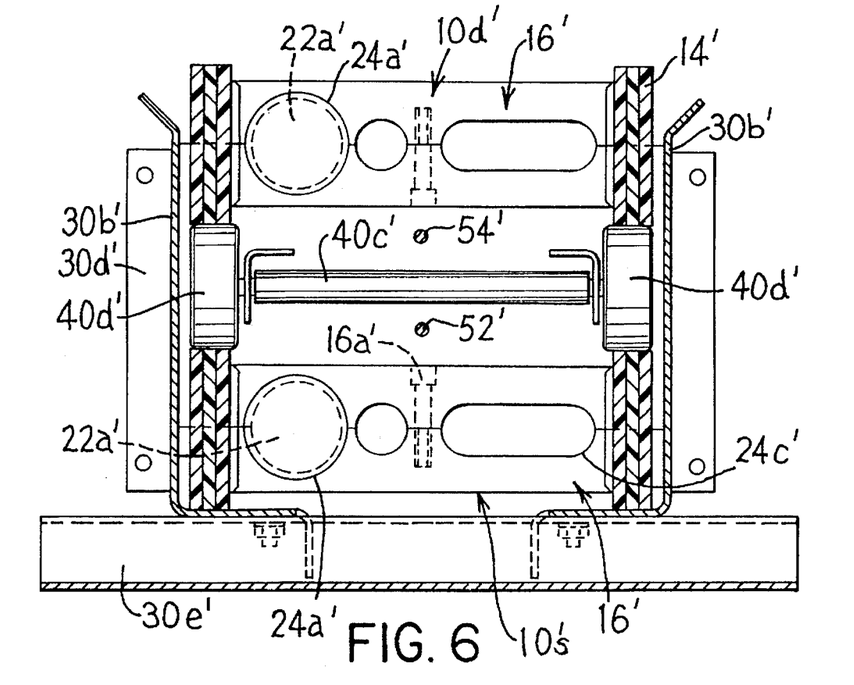
FIG. 6 is a transverse cross sectional view taken along lines 6—6 of FIG. 1.
Figure 7:
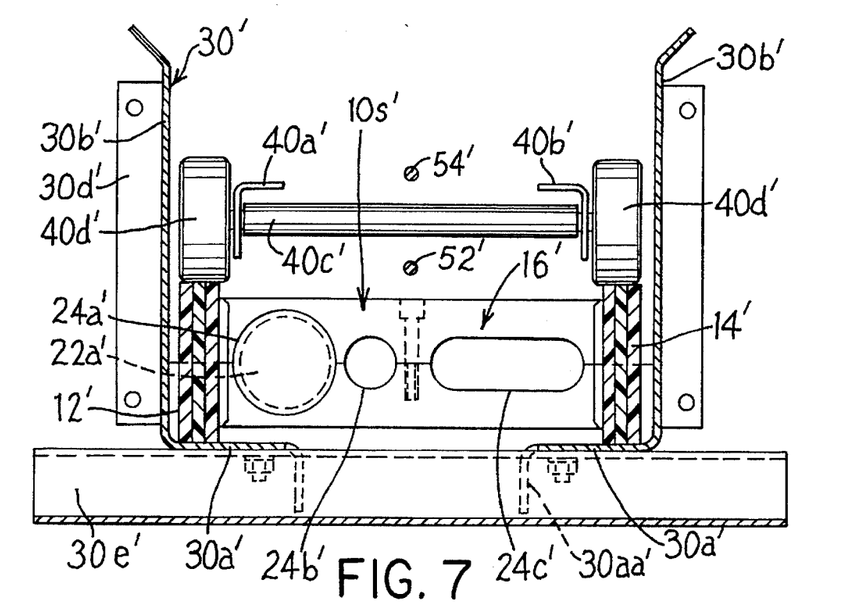
FIG. 7 is a transverse cross sectional view taken along lines 7—7 of FIG. 1.
Figure 8:
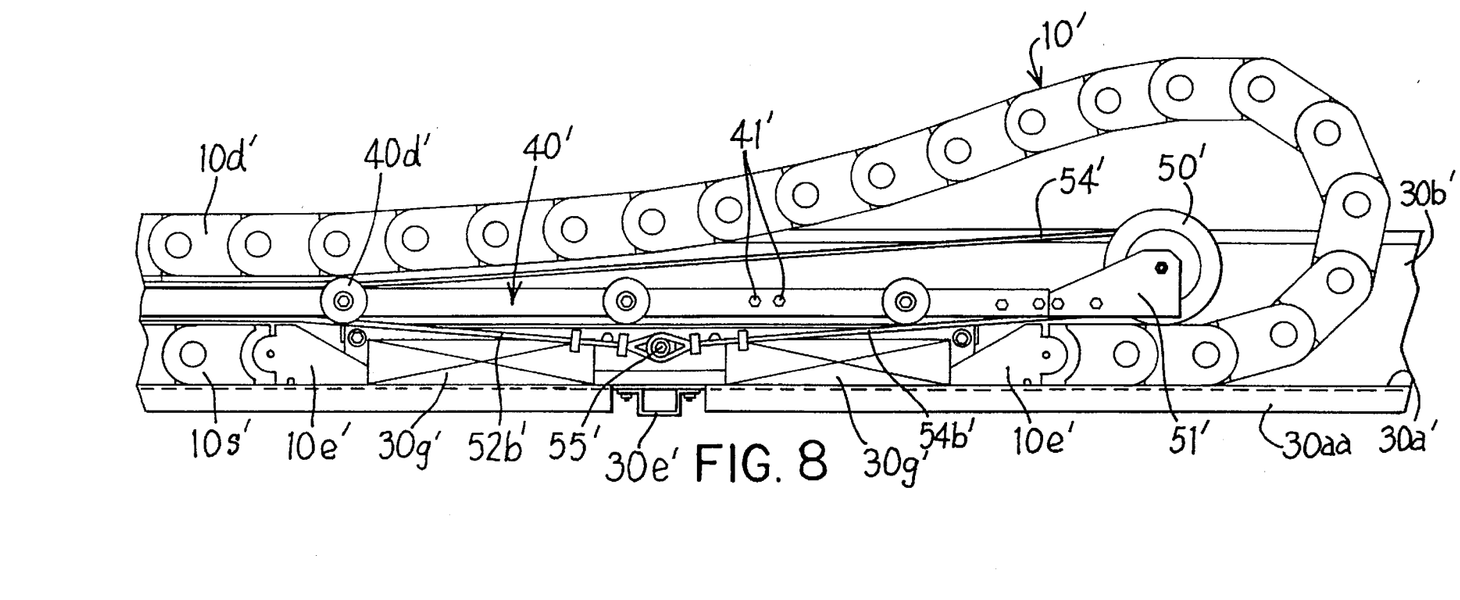
FIG. 8 is an enlarged partial longitudinal cross sectional view of the fixed end of the power supply chains of FIG. 5.

A carriage 40' like that described hereabove is disposed between the first and second power supply chains 10' for movement in response to movement of the power consumer via sheaves or pulleys 50' and cables or ropes 52', 54'. The carriage wheels or rollers 40d' are positioned by movement of the carriage in response to movement of the power consumer to support a dynamic portion of one of the first and second chains 10' (e.g. the right hand chain in FIG. 5) when it sags into the guide tray 30' as a result of that chain travelling beyond its self-supporting travel distance. The support of the sagging portion 10d' of the power supply chain by the carriage rollers 40d' is shown in FIG. 6. At the same time, the carriage wheels or rollers ride on the static portion 10s' of the other chain (e.g. the left hand chain in FIG. 5) which is not extended beyond its self-supporting travel distance. The support of the static portion 10s of the power supply chain by the guide tray 30' is shown in FIG. 7.

As is apparent in FIGS. 5–8, the first and second power supply chains 10' each extend in a bend B' of predetermined radius out of the guide tray 30'. The carriage rollers 40d' have a radius dimension that is independent of the radius of the chain bend B' since the carriage rollers 40d' do not support the chains at the bends B'. Instead, the carriage rollers 40d' are spaced from the power supply chains 10' at the bends B' as in FIGS. 1–4. The radius dimension of the carriage rollers 40d' is substantially less than that of the bend radius and the height dimension of the carriage 40' is minimized as shown in FIGS. 5–8 to provide a compact, light-weight, low center-of-gravity carriage that nests or resides within the dimensions of the guide tray 30' as shown so that the static portion 10s' of the lower power supply chain and the power conduits carried thereon are guided, confined laterally, and protected in the guide tray 30'. Also, the carriage wheels 40d' are sized such that the lower static portion 10s', the carriage 40', and a majority of the height of the upper sagging portion 10d' of the upper chain 10' reside within the guide tray 30'. In this way, the sagging portion 10d' of the upper chain is confined and supported from beneath by frictional engagement with the carriage rollers 40d' and laterally by the guide tray sidewalls 30b' to prevent unwanted lateral chain movement.

Of course, the power supply chains 10' reverse position in the guide tray 30' when the power consumer PC' is positioned at the other end of its travel stroke. The carriage 40' is moved in response to movement of the power consumer so as to be positioned between the lower static portion of one chain and the sagging dynamic portion of the other chains which would be reversed in position in the guide tray 30' when the power consumer is moved to the opposite end of its travel stroke.

In addition to including a pair of opposing power supply chains 10' rather than a single power supply chain, the embodiment of FIGS. 5–8 differs from that of FIG. 1–4 in that the guide tray 30' includes sidewall flanges (not shown but like those flanges 31 of FIGS. 1–4) only in the region of the guide tray 30' where the fixed ends of the chains 10' are separated; i.e. sidewall flanges for supporting the carriage rollers 40d' extend only along the sidewalls in the vicinity of the cable access slots 30g'.

Otherwise, the apparatus of FIGS. 5–8 functions in a manner similar to that of FIGS. 1–4.

The embodiments of the present invention described hereabove overcome the aforementioned disadvantages of previous flexible power conduit supply systems in a manner to reduce wear of the power supply chain components, reduce towing forces at the tow arm of the movable power consumer, permit an increase in the travel stroke of the power supply chain(s), while receiving and supporting the power supply chain(s) within a guide tray.

Although the present invention has been described in detail with respect to a power supply apparatus using a guide tray to receive and guide the power supply chain(s), these specific embodiments are offered for purposes of illustration and not limitation since the invention may be practiced without use of a guide tray which is optional. Moreover, although the present invention has been described with respect to certain specific embodiments thereof, it is to be understood that the invention is not limited thereto and that changes can made therein without departing from the scope of the invention as set forth in the following claims.

I claim:

1. Apparatus for carrying at least one flexible power conduit to supply power to a relatively movable power consumer, comprising:

at least one power supply chain having a fixed end and a movable end where said chain is connected to said power consumer, said power supply chain including a plurality of transverse carrier members for supporting said flexible power conduit between said fixed and movable ends and having a bend of predetermined radius in the chain between a static portion and a dynamic portion thereof, a chain carriage disposed between said static portion and dynamic portion for movement in response to movement of said power consumer and having rollers on opposite sides, said rollers having a radius less than said radius of said bend such that said chain is spaced from and unsupported by said rollers at said bend, said carriage being movable to position said rollers to supportingly engage the dynamic portion of said chain when it sags as a result of said chain travelling beyond its self-supporting travel distance, and means for drivingly connecting said carriage and said power consumer such that said carriage is moved in response to movement of said power consumer and such that said carriage assists movement of said chain by virtue of frictional engagement between said wheels and said chain.

2. The apparatus of claim 1 wherein said power supply chain comprises first and second elongated side chains and a plurality of transverse carrier members for the flexible power conduit.

3. The apparatus of claim 2 wherein said power supply chain comprises plastic first and second elongated side chains.

4. The apparatus of claim 1 wherein said means for drivingly connecting said carriage and said power consumer comprises a rotatable sheave or pulley proximate each end of said carriage and pair of cables, one cable having an end connected to said power consumer and an opposite end fixed in position with an intermediate cable section reeved around one of said sheaves or pulleys and the other cable having an end connected to said power consumer and an opposite end fixed in position with an intermediate cable section reeved around the other of said sheaves or pulleys.

5. The apparatus of claim 4 wherein one of said cables extends below a central region of said carriage and the other cable extends above the central region of said carriage.

6. The apparatus of claim 1 wherein said carriage comprises first and second side frames and a plurality of axles disposed transversely therebetween and on which said rollers are rotatably disposed.

7. Apparatus for carrying at least one flexible power conduit to supply power to a relatively movable power consumer, comprising:

a power supply chain having a fixed end and a movable end where said chain is connected to said power consumer, said power supply chain including a plurality of transverse carrier members for supporting said flexible power conduit between said fixed and movable ends for supplying power to said movable power consumer, an elongated guide tray including a bottom wall and spaced apart upstanding side walls that define a channel for receiving a static portion of said chain while a dynamic portion of said chain extends out of said guide tray to said power consumer, each said sidewall including a surface that is generally coplanar with a top surface of said static portion of said chain and that is disposed longitudinally between said fixed end and a maximum position of travel of said movable end, a chain carriage disposed in said channel of said guide tray for movement in response to movement of said power consumer and having rollers on opposite sides, said carriage being movable to position said rollers on said sidewall surfaces to supportingly engage the dynamic portion of said chain when it sags into said guide tray as a result of said chain travelling beyond its self-supporting travel distance, while said sidewalls confine lateral movement of said sagging portion of said chain, and means for drivingly connecting said carriage and said power consumer such that said carriage is moved in said channel in response to movement of said power consumer and such that said carriage assists movement of said chain by virtue of engagement between said wheels and said chain.

8. The apparatus of claim 7 wherein said power supply chain includes a bend of predetermined radius between said static portion and said dynamic portion thereof, said carriage rollers having a radius less than the bend radius such that said chain is spaced from and unsupported by said rollers at said bend.

9. The apparatus of claim 8 wherein said carriage rollers are sized such that said carriage and a majority of said sagging portion of said chain reside in said guide tray when said chain travels beyond its self-supporting travel distance, whereby said sagging portion is confined and supported by engagement with said rollers and laterally by said sidewalls.

10. The apparatus of claim 7 wherein said power supply chain comprises first and second elongated side chains and a plurality of transverse carrier members for the power conduit.

11. The apparatus of claim 10 wherein said power supply chain comprises plastic first and second elongated side chains.

12. The apparatus of claim 7 wherein said means for drivingly connecting said carriage and said power consumer comprises a rotatable sheave or pulley proximate each end of said carriage and pair of cables, one cable having an end connected to said power consumer and an opposite end fixed in position with an intermediate cable section reeved around one of said sheaves or pulleys and the other cable having an end connected to said power consumer and an opposite end fixed in position with an intermediate cable section reeved around the other of said sheaves or pulleys.

13. The apparatus of claim 12 wherein one of said cables extends below a central region of said carriage and the other cable extends above the central region of said carriage.

14. The apparatus of claim 7 wherein said carriage comprises first and second side frames and a plurality of axles disposed transversely therebetween and on which said rollers are rotatably disposed.

15. Apparatus for carrying at least two flexible power conduits to supply power to a relatively movable power consumer, comprising:

first and second opposing power supply chains each having a fixed end and a movable end where each said chain is connected to said power consumer, each said power supply chain including a plurality of transverse carrier members for supporting a respective flexible power conduit between said fixed and movable ends for supplying power to said movable power consumer, a chain carriage disposed between said first and second chains for movement in response to movement of said power consumer and having rollers on opposite sides, said carriage being movable to position said rollers to support a dynamic portion of one of said first and second chains when it sags as a result of said one of said first and second chains travelling beyond its self-supporting travel distance, while said rollers ride on a static portion of the other of said first and second chains, and means for drivingly connecting said carriage and said power consumer such that said carriage is moved in response to movement of said power consumer and such that said carriage assists movement of said first and second chains by virtue of frictional engagement between said wheels and said first and second chains.

16. The apparatus of claim 15 wherein said first and second power supply chain each include a bend of predetermined radius between said static and dynamic portions thereof and wherein said rollers have a radius less than the bend radius such that said first and second chains are spaced from and unsupported by said rollers at said bends.

17. The apparatus of claim 16 wherein each said power supply chain comprises first and second elongated side chains and a plurality of transverse carrier members for the power conduit.

18. The apparatus of claim 17 wherein each said power supply chain comprises plastic first and second elongated side chains.

19. The apparatus of claim 15 wherein said means for drivingly connecting said carriage and said power consumer comprises a rotatable sheave or pulleys proximate each end of said carriage and pair of cables, one cable having an end connected to said power consumer and an opposite end fixed in position with an intermediate cable section reeved around one of said sheaves or pulleys and the other cable having an end connected to said power consumer and an opposite end fixed in position with an intermediate cable section reeved around the other of said sheaves or pulleys.

20. The apparatus of claim 19 wherein one of said cables extends below a central region of said carriage and the other cable extends above the central region of said carriage.

21. The apparatus of claim 15 wherein said carriage comprises first and second side frames and a plurality of axles disposed transversely therebetween and on which said rollers are rotatably disposed.

22. Apparatus for carrying at least two flexible power conduits to supply power to a relatively movable power consumer, comprising:

first and second opposing power supply chains each having a fixed end and a movable end where each said chain is connected to said power consumer, each said power supply chain including a plurality of transverse carrier members for supporting a respective flexible power conduit between said fixed and movable ends for supplying power to said movable power consumer, an elongated guide tray including a bottom wall and spaced apart upstanding side walls that define a channel for receiving a static portion of each said chain while a dynamic portion of each said chain extends out of said guide tray to said power consumer, a chain carriage disposed in said channel of said guide tray between said first and second chains for movement in response to movement of said power consumer and having rollers on opposite sides, said carriage being movable in said guide tray to position said rollers to support the dynamic portion of one of said first and second chains when it sags into said guide tray as a result of said one of said first and second chains travelling beyond its self-supporting travel distance, while said sidewalls confine lateral movement of said sagging portion of said one of said first and second chains, and means for drivingly connecting said carriage and said power consumer such that said carriage is moved in said channel in response to movement of said power consumer and such that said carriage assists movement of said first and second chains by virtue of engagement between said wheels and said first and second chains.

23. The apparatus of claim 22 wherein said first and second power supply chain each include a bend of predetermined radius between said static and dynamic portions thereof and wherein said rollers have a radius less than the bend radius such that said first and second chains are spaced from and unsupported by said rollers at said bends.

24. The apparatus of claim 22 wherein said carriage rollers are sized such that said carriage and a majority of said sagging portion of said one of said first and second chains reside in said guide tray, whereby said sagging portion is confined and supported by engagement with said wheels and laterally by said sidewalls.

25. The apparatus of claim 22 wherein each said power supply chain comprises fist and second elongated side chains and a plurality of transverse carrier members for the power conduit.

26. The apparatus of claim 25 wherein each said power supply chain comprises plastic first and second elongated side chains.

27. The apparatus of claim 22 wherein said means for drivingly connecting said carriage and said power consumer comprises a rotatable sheave or pulley proximate each end of said carriage and pair of cables, one cable having an end connected to said power consumer and an opposite end fixed in position with an intermediate cable section reeved around one of said sheaves or pulleys and the other cable having an end connected to said power consumer and an opposite end fixed in position with an intermediate cable section reeved around the other of said sheaves or pulleys.

28. The apparatus of claim 27 wherein one of said cables extends below a central region of said carriage and the other cable extends above the central region of said carriage.

29. The apparatus of claim 22 wherein said carriage comprises first and second side frames and a plurality of axles disposed transversely therebetween and on which said rollers are rotatably disposed.

* * * * *